United States Patent [19]
Yabe et al.

[11] Patent Number: 5,374,291
[45] Date of Patent: Dec. 20, 1994

[54] METHOD OF PROCESSING PHOTOSENSITIVE GLASS

[75] Inventors: Akira Yabe; Hiroyuki Niino, both of Ibaraki; Nobuhiro Kondo, Tokyo; Hirokazu Ono, Tokyo; Tomoaki Takahashi, Tokyo; Yoshinaga Takahashi, Tokyo; Toshio Matsumura, Tokyo, all of Japan

[73] Assignees: Director-General of Agency of Industrial Science and Technology; Seikosha Co., Ltd., both of Tokyo, Japan

[21] Appl. No.: 66,318

[22] Filed: May 21, 1993

Related U.S. Application Data

[63] Continuation of Ser. No. 805,414, Dec. 10, 1991, abandoned.

[51] Int. Cl.$^5$ .............................. C03C 23/00
[52] U.S. Cl. ........................ 65/30.11; 65/31; 65/DIG. 4; 65/33.2
[58] Field of Search ............ 65/30.11, 31, 33, DIG. 4

[56] References Cited

U.S. PATENT DOCUMENTS

| | | | |
|---|---|---|---|
| 4,606,747 | 8/1986 | Steinhoff | 65/31 |
| 4,769,310 | 9/1988 | Gugger et al. | 65/30.11 X |
| 4,797,316 | 1/1989 | Hecq et al. | |
| 4,842,629 | 6/1989 | Clemens et al. | 65/31 X |
| 4,847,138 | 7/1989 | Boylan et al. | 65/30.11 X |
| 4,854,957 | 8/1989 | Borrelli et al. | 65/30.11 |
| 4,915,718 | 4/1990 | Desai | 65/31 |
| 5,028,514 | 7/1991 | Johannsen | |

FOREIGN PATENT DOCUMENTS

3742374A1 7/1988 Germany.
3814720A1 11/1989 Germany.

OTHER PUBLICATIONS

Entwicklungstendenzen bei der Applikation Von Lasern zur Veredlung Von Glaserzeugnissen, Ludwig Stadtler, Silikattechnik 41 (1990) Seiten 95 bis 99, plus English language concise explanation.
Takashi, Matsuura, "Photo Chemically Machinable Glass Ceramics", Practical Surface Technologies, No. 11, p. 1–7 (1988).

*Primary Examiner*—Robert L. Lindsay
*Attorney, Agent, or Firm*—Jordan & Hamburg

[57] ABSTRACT

A method of processing a photosensitive glass includes exposing. Photosensitive glass by radiation from a laser whose oscillation wavelength lies within the range of wavelengths of exposing light to which the glass responds. Then, the exposed portions 1c are thermally developed and etched. Since a laser beam propagates with a high rectilinearity, the front and rear surfaces of thick photosensitive glass can be exposed without producing dimensional errors. Therefore, the etching accuracy is improved. Especially, where the front and rear surfaces of photosensitive glass are etched, both surfaces can be processed so as to form the same shape in them accurately. In addition, because almost all the energy of the laser radiation is used for exposure of the photosensitive glass, the energy is not wasted and so the efficiency is high.

22 Claims, 10 Drawing Sheets

SPECTRAL DISTRIBUTION OF XeCl EXCIMER LASER
RANGE OF WAVELENGTHS FOR EXPOSING PHOTOSENSITIVE GLASS BY LASER

TOTAL AMOUNT OF ENERGY OF EXPOSING LIGHT

METHOD OF PROCESSING PHOTOSENSITIVE GLASS

This application is a continuation of application Ser. No. 07/805,414 filed Dec. 10, 1991 abandoned.

The present invention relates to a method of exposing photosensitive glass with light to process it.

BACKGROUND OF THE INVENTION

A method of exposing photosensitive glass to light and thermally developing it has been heretofore known. The developed glass may be etched. For example, this method is described by Takashi Matsuura in his paper entitled, "Photo Chemically Machinable Glass Ceramics", *Practical Surface Technologies*, No. 11, pp. 1–7, 1988. This is hereinafter referred to as Reference 1. This method comprises an exposure step, a thermal development step, and an etching step. In the exposure step, desired portions of photosensitive glass are exposed to light from an ultraviolet lamp such as an extra-high pressure mercury lamp. In the thermal development step, the glass is heated to 500° to 700° C. to crystallize the exposed portions. In the etching step, the crystallized, exposed portions are dissolved away by an etchant (solution of hydrofluoric acid).

Even if the method ends with the thermal development step without carrying out the etching step, a crystalline portion formed in the glass appears to be colored yellow or brown because of the light-transmitting characteristics of the crystalline portion. Therefore, this glass can be used for displaying or recording purposes.

PROBLEMS TO BE SOLVED BY THE INVENTION

Referring to FIG. 21, the prior art method is illustrated. That is, photosensitive glass 14 is exposed to light emitted from an ultraviolet lamp 13 such as an extra-high pressure mercury lamp. This conventional method has various problems as described later. First, it takes long to expose the glass. Also, it is impossible to microscopically process it because the rectilinearity is low. The low rectilinearity also blurs the exposure pattern on a surface 14b opposite to the incident surface 14a on which light is incident.

FIG. 22 shows the spectral distribution of an extra-high pressure mercury lamp which is normally known as an ultraviolet lamp. This graph shows that the spectral distribution of the mercury lamp covers a wide range of wavelengths as well as the ultraviolet range. Reference 1 says that photosensitive glass normally responds to wavelengths between 240 nm and 360 nm of the radiation emitted from an ultraviolet ray source. That is, where a mercury lamp is used, wavelengths exceeding 360 nm do not participate in the exposure of photosensitive glass. This means that a large portion of the irradiating energy is consumed fruitlessly. Hence, the efficiency of the exposure is low, and the exposure time is long. Reference 1 cites an example in which an exposure operation was performed for 13 minutes, using a Hg-Xe lamp. The present applicant conducted an experiment, and has found that an exposure as long as 30 minutes was needed to expose photosensitive glass with an ultra-high pressure mercury lamp of 500 W (manufactured by Ushio Electric Co., Ltd, under the product name Multilight II Type).

Unfortunately, individual sheets of photosensitive glass are required to be exposed one by one. In order to increase the production efficiency, expensive exposure apparatuses must be prepared in large numbers. Alternatively, the exposure time must be shortened.

Meanwhile, in order to make the exposure pattern finer and to reduce the blurring of the pattern on the surface opposite to the incident surface, the rectilinearity of the light source must be improved. Thus, it is necessary to focus the light source so that it may approximate an ideal point source. This, in turn, lowers the brightness of the light source. As a result, the exposure time is increased by several times. Consequently, the production efficiency is deteriorated greatly. In this way, there is a demand for a reduction in the exposure time to extend the application of photosensitive glass as well as to avoid the above problems.

The present applicant also performed a series of experiments, each for three hours, using an exposure apparatus designed to process semiconductors, to find the limitation of microscopic processing. The exposure apparatus was Mask Aligner PLA manufactured by Canon. This apparatus uses a light source having a relatively good rectilinearity. An extra-high pressure mercury lamp of 250 W is used as the light source. The used photosensitive glass consists principally of 70–84% $SiO_2$, 5–20% $Li_2O$, 3–10% $Al_2O_3$, 0.01–0.1% $CeO_2$, 0.05–0.3% Ag, and 0.1–0.3% $As_2O_3$. In some of the experiments, trace amounts of other substances such as $Na_2O$, $SnO_2$, $Cu_2O$, ZnO, $K_2O$, PbO, CaO, SrO, BaO, and $ZrO_2$ were added.

The results of the experiments have shown that the limit etch depth is 48 μm and the limit pattern size is a width of approximately 8 μm. However, there is a demand for finer processing techniques in the fields of ink jet printer heads and of micromachining. The aforementioned limits of the microscopic processing set by the low rectilinearity of the light source for the exposure have impeded the application of photosensitive glass to these fields.

The present applicant has also conducted an experiment regarding the blurring of pattern on the back side of incident light and has found the following facts. Even where a photosensitive glass of the above-described composition was exposed by the use of an improved optics, a crystalline portion spreading at an angle of 1.4 degrees with respect to the incident direction was formed. In particular, the optics contained an extra-high pressure mercury lamp of 600 W (manufactured by Ushio Electric Co., Ltd, under the product name Multilight II Type). The optics was so devised that the rectilinearity was improved. In the case of a photosensitive glass having a thickness of 1 mm, the pattern spreads 24 μm on either side provided that the pattern is 100 μm. On the rear side of the incident light, the pattern spreads 148 μm. This poses problems from a practical point of view.

SUMMARY OF THE INVENTION

Accordingly, it is an object of the present invention to provide a processing method of exposing even thick photosensitive glass with high dimensional accuracy. It is another object of the invention to provide a processing method of carrying out an exposure operation efficiently in a short time.

The novel method of processing photosensitive glass is characterized in that the glass is exposed by irradiation of a laser whose oscillation wavelength lies within the range of wavelengths of exposing light to which the glass responds. The processing can comprise an exposure step using the laser, a thermal development step for crystallizing the exposed portions, and a step for etching the crystalline portions. Preferably, the laser is an excimer laser. Specifically, the oscillation wavelength lies in the range from 150 nm to 400 nm.

In the exposure step, an exposure pattern can be created by causing a sharply focused laser beam to hit the irradiated area of photosensitive glass while moving the beam manually, with a scanning system moved along a guide curve by means of a jig or the like, or with a scanning system that moves according to information either produced by a computer or stored in it. A more complex exposure pattern can also be created by repeatedly turning on and off the irradiation of the laser beam according to information either produced by a computer or stored in it while moving the laser irradiation apparatus relative to the glass.

Where the exposed photosensitive glass is cut into plural parts in a direction not parallel to the direction of exposure, a plurality of members of photosensitive glass can be efficiently obtained.

The exposure step can consist in exposing laminated sheets of photosensitive glass simultaneously. In this case, numerous sheets of photosensitive glass can be processed with improved efficiency.

The exposure step can also consist in irradiating the photosensitive glass with a laser beam while placing the glass in a liquid having a refractive index approximating that of the glass. In this case, the exposure operation can be carried out with higher efficiency.

In the exposure step, a quite fine shape which can be controlled by the dimensions of the patterning mask is exposed efficiently by placing an exposure patterning mask between photosensitive glass and a laser irradiation optical system.

In an exposure step using a quite sharply focused laser beam, a complex exposure pattern can be easily created by the use of an exposure patterning mask.

Figure 4:
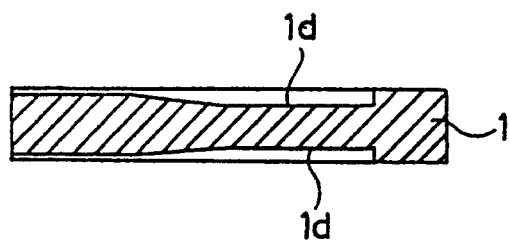
Figure 5:
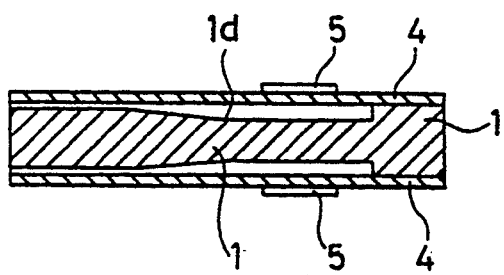
Figure 6:
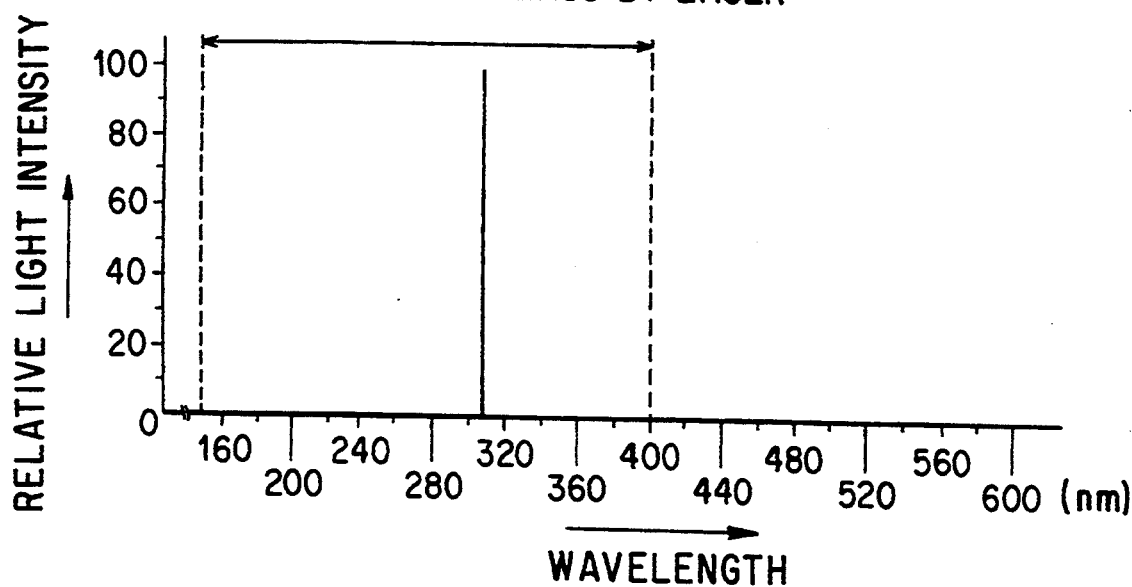
Figure 7:
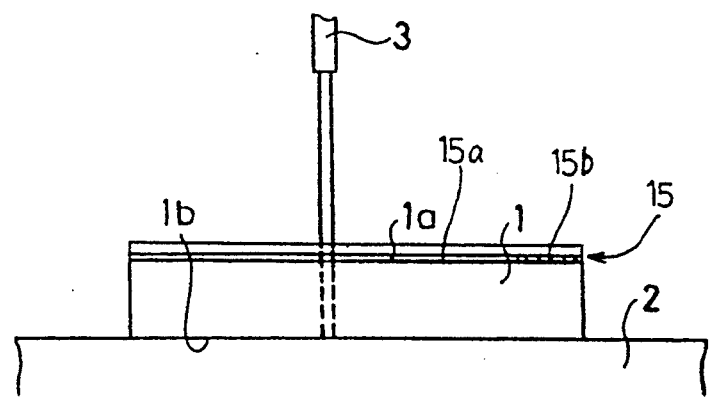
Figure 8:
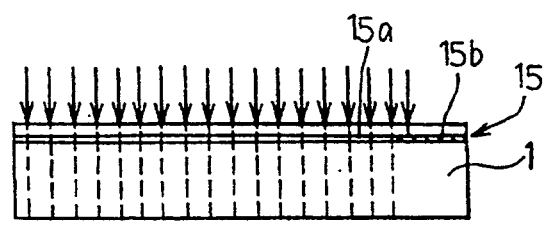
Figure 9:
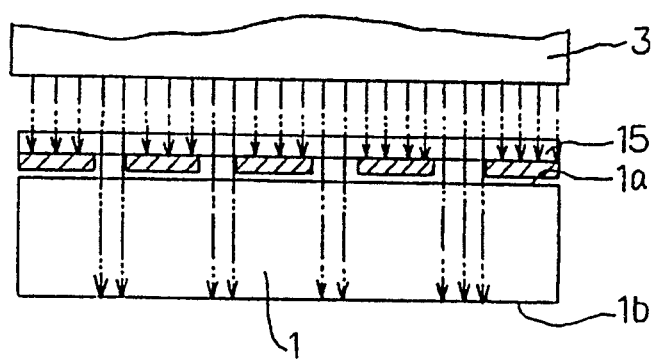
Figure 10:
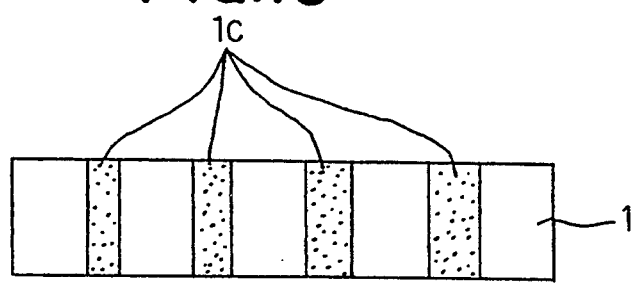
Figure 11:
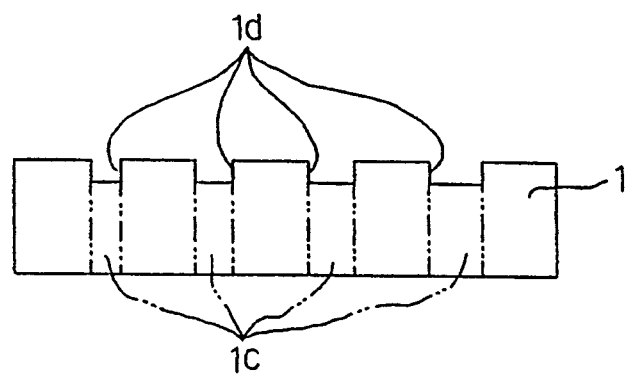
Figure 12:
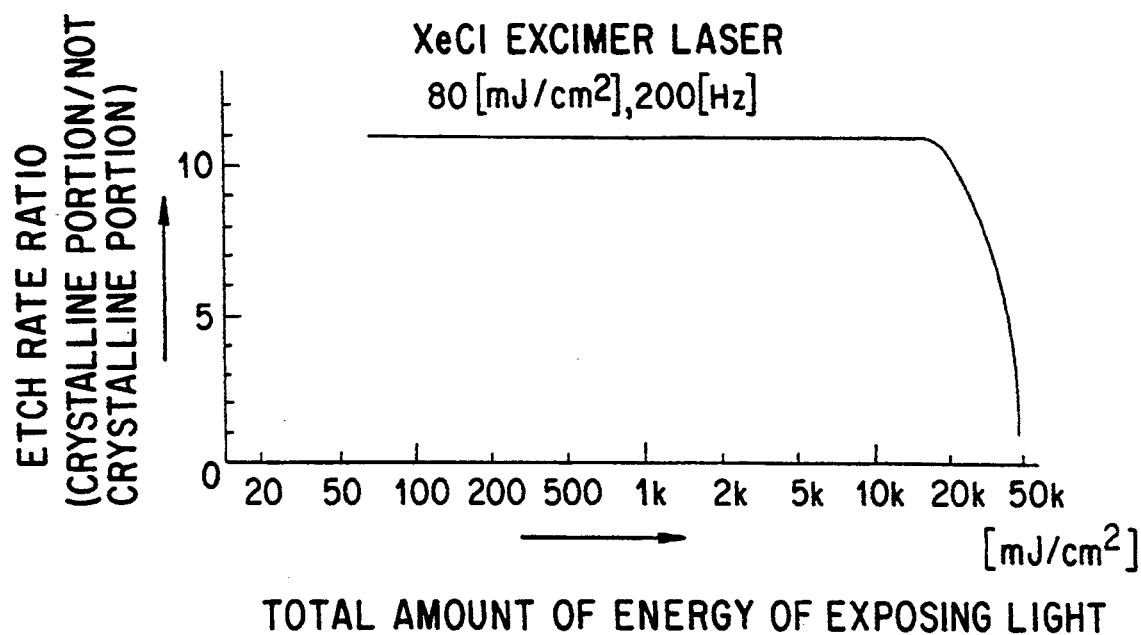
Figure 13:
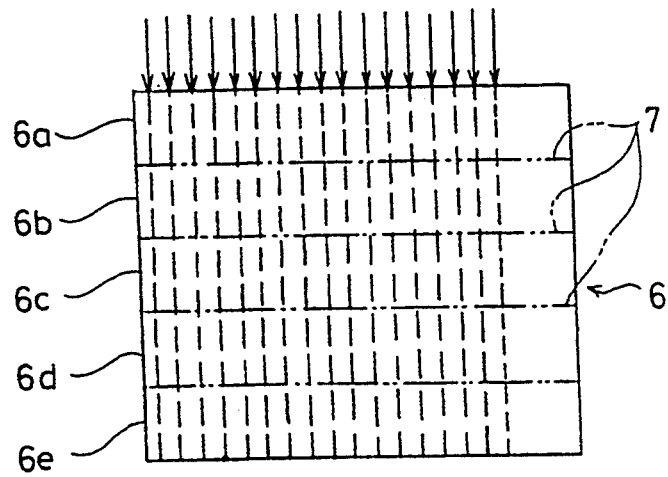
Figure 14:
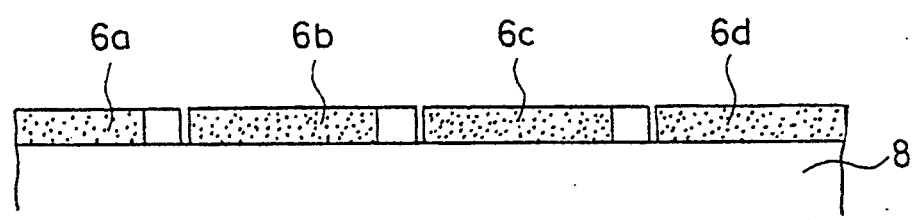
Figure 15:
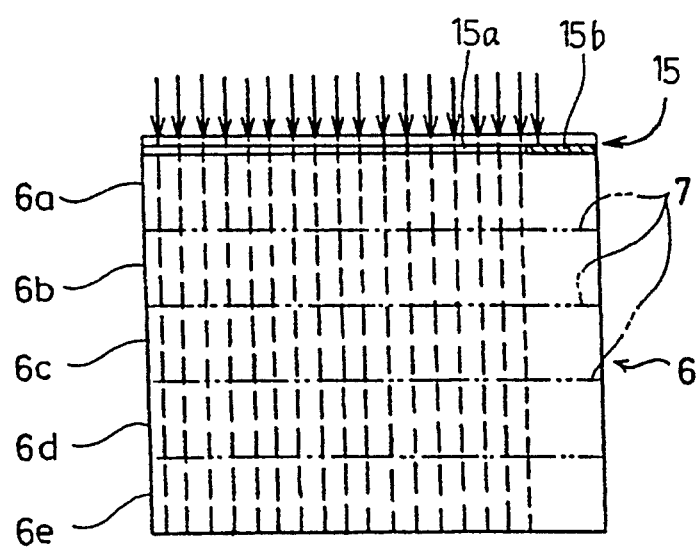
Figure 16:
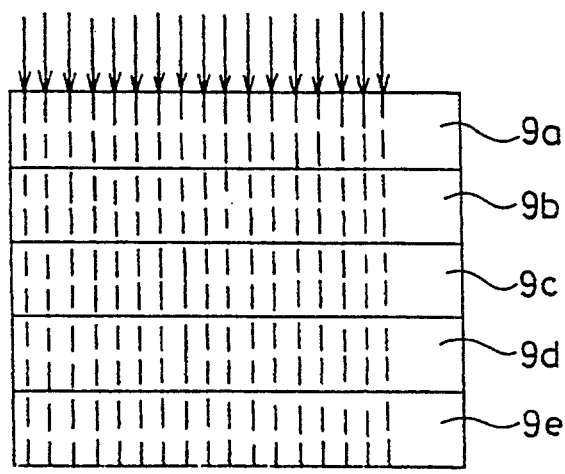
Figure 17:
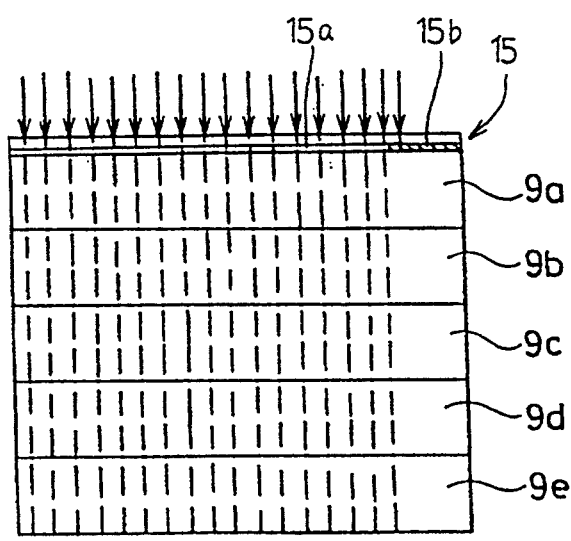
Figure 18:
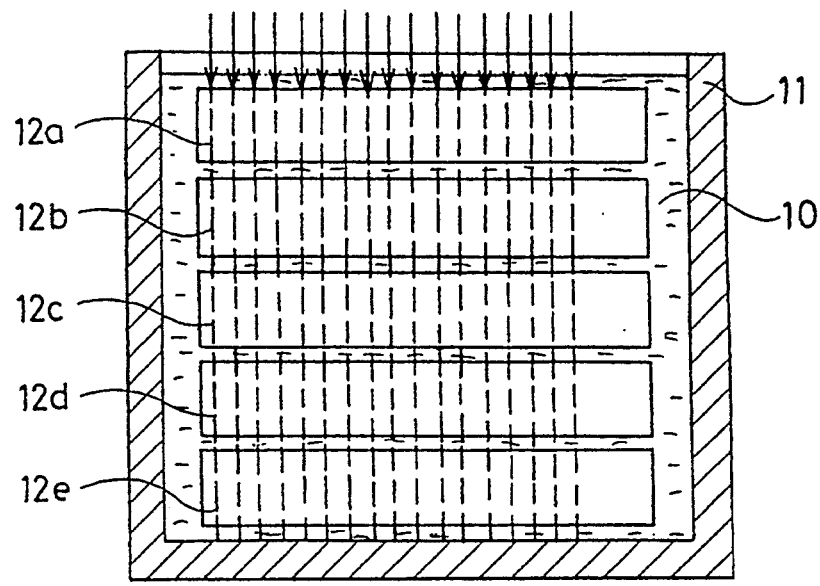
Figure 19:
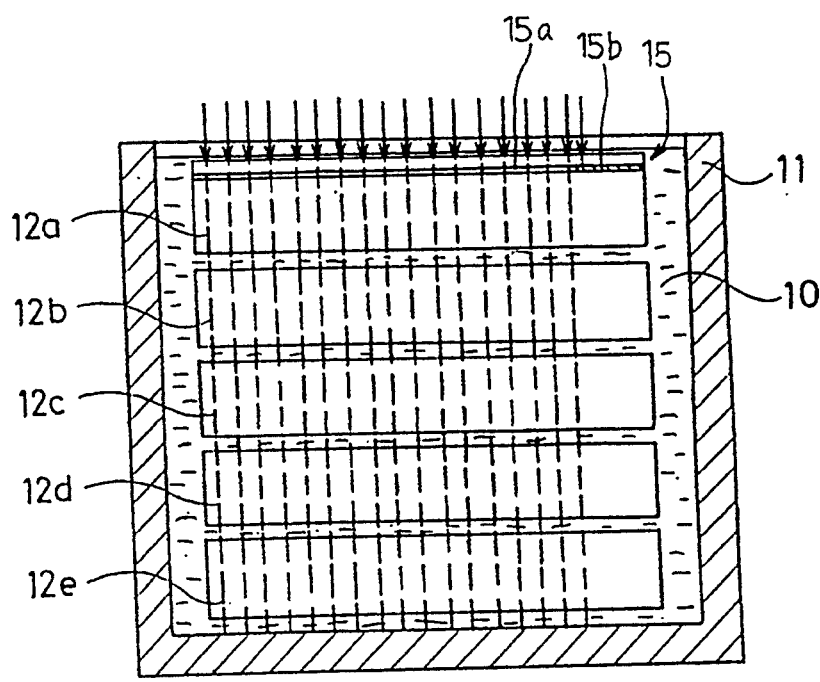
Figure 20:
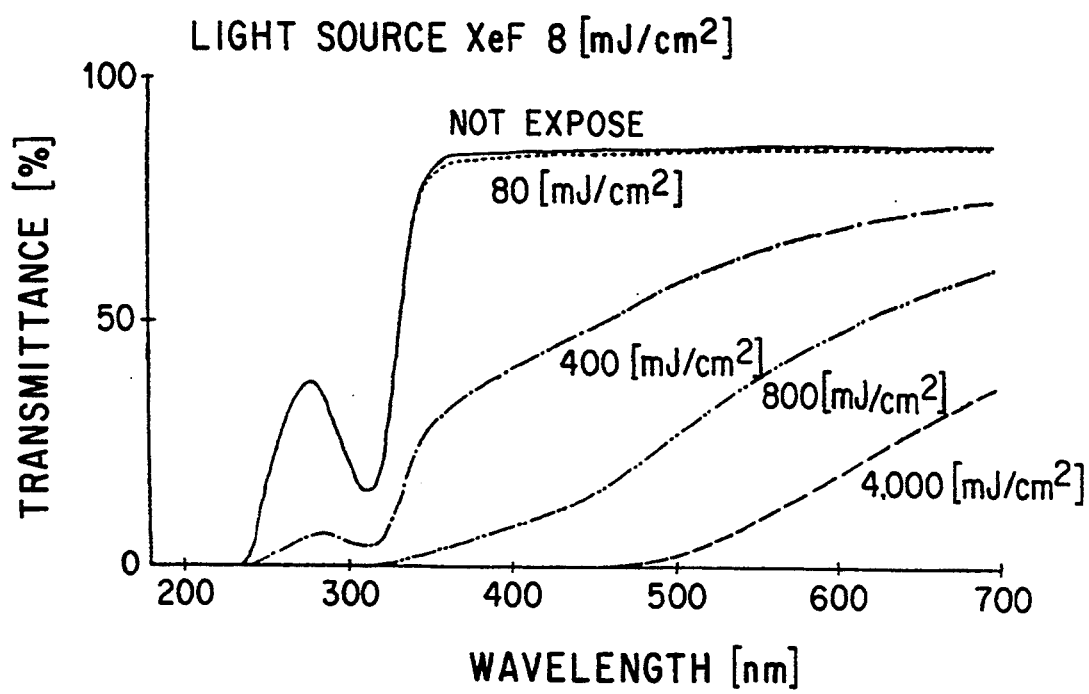
Figure 21:
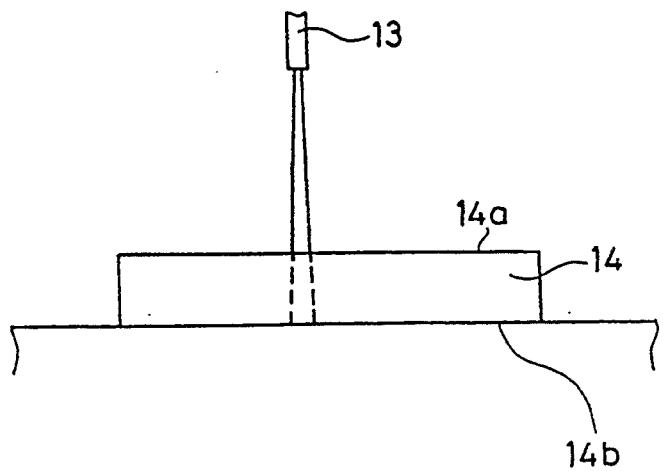
Figure 22:
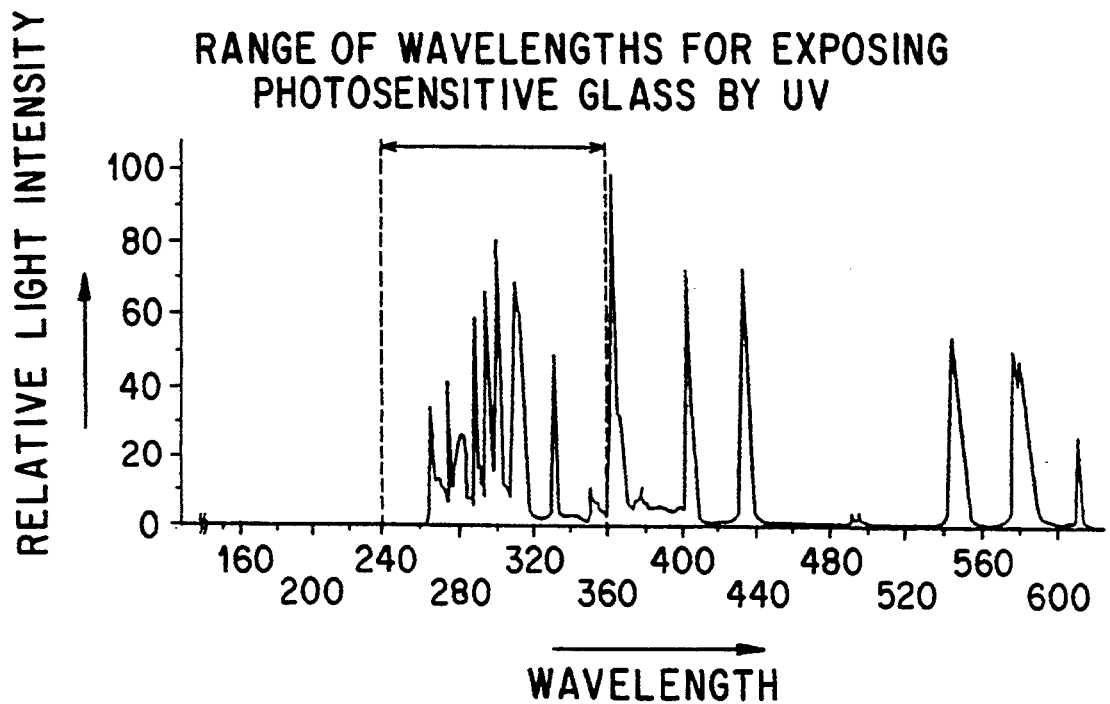
Figure 23:
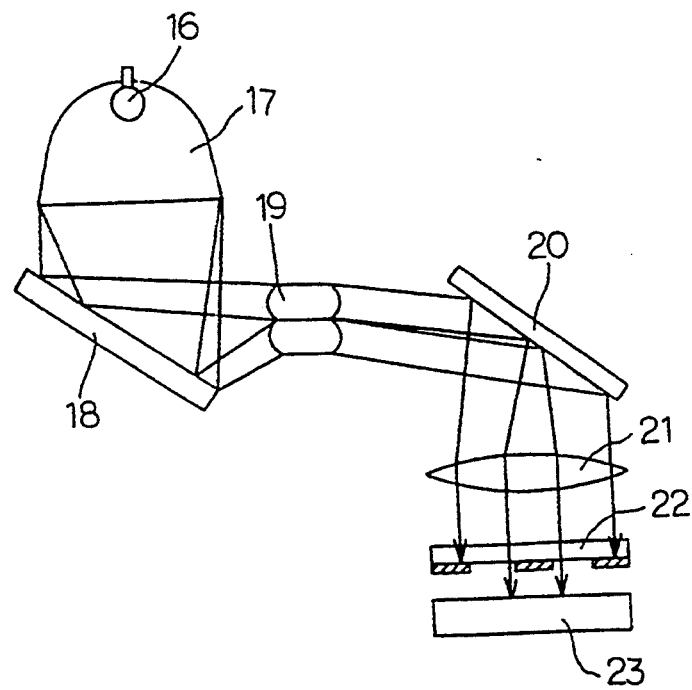

FIG. is a front elevation of photosensitive glass processed in a thermal development step;

FIG. 4 is cross-sectional view of photosensitive glass which has undergone an etching step;

FIG. 5 is a cross-sectional view of an ink jet printer head fabricated from photosensitive glass;

FIG. 6 is a graph showing the spectral distribution of a xenon chloride excimer lager;

FIG. 7 is a front elevation illustrating an exposure step using a patterning mask for exposure in the first embodiment;

FIG. 8 is a front elevation of photosensitive glass which has undergone the exposure step illustrated in FIG. 7;

FIG. 9 is a front elevation illustrating another example of exposure step using a patterning mask for exposure in the first embodiment;

FIG. 10 is a front elevation of the photosensitive glass shown in FIG. 9, and in which the glass has been thermally developed;

FIG. 11 is a front elevation of the photosensitive glass shown in FIG. 9, and in which the glass has been etched;

FIG. 12 is a graph showing the relation between the total amount of energy of exposing light and the etch rate ratio in the first embodiment;

FIG. 13 is a front elevation illustrating the exposure step of a second embodiment of the invention;

FIG. 14 is a foreshortened front elevation illustrating the etching step of the second embodiment;

FIG. 15 is a front elevation illustrating an exposure step using a patterning mask for exposure in the second embodiment;

FIG. 16 is a front elevation illustrating the exposure step of a third embodiment of the invention;

FIG. 17 is a front elevation illustrating an exposure step using a patterning mask for exposure in the third embodiment;

FIG. 18 is a front elevation illustrating the exposure step in fourth embodiment of the invention;

FIG. 19 is a front elevation illustrating an exposure step using a patterning mask for exposure in the fourth embodiment;

FIG. 20 is a graph showing the relation between the wavelength of light incident on photosensitive glass of a fifth embodiment of the invention and its transmittance;

FIG. 21 is a front elevation illustrating a conventional exposure step;

FIG. 22 is a graph showing the spectral distribution of light emitted from a mercury lamp; and FIG. 23 is a front elevation illustrating another conventional exposure step.

DESCRIPTION OF THE PREFERRED EMBODIMENTS

Embodiments of the invention are hereinafter described by referring to the drawings.

Figure 1:
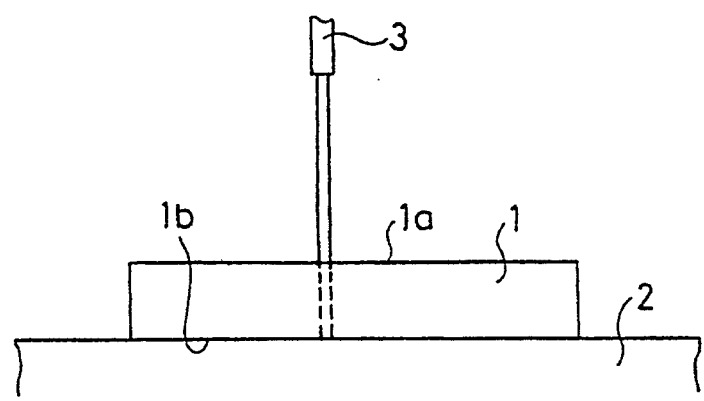
FIG. 1 is a front elevation illustrating an exposure step according to a first embodiment of the present invention.
Figure 2:
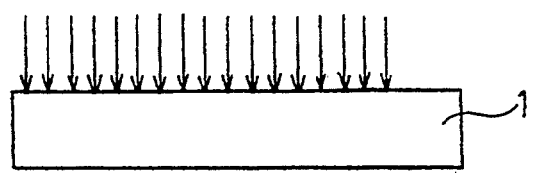
FIG. 2 is a front elevation of photosensitive glass which has undergone the exposure step illustrated in FIG. 1.

The individual steps of the novel method of fabricating an ink jet printer head from photosensitive glass are described successively by referring to FIGS. 1–5. First, as shown in FIG. 1, a sheet of photosensitive glass 1 having polished front and rear surfaces 1a, 1bis placed on a carriage 2. In the present embodiment, the thickness of the sheet 1 is 1 mm. An excimer laser 3 located above the sheet of glass emits an XeCl excimer laser beam. Then, all the portions of the glass sheet 1 to be etched are exposed, as shown in FIG. 2, either by moving the carriage 2 by means of a moving device or optical system (not shown) or by scanning the laser beam.

Figure 3:
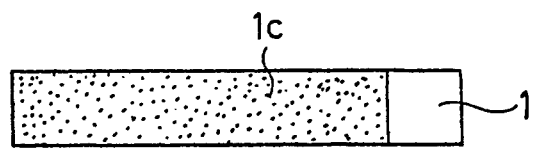

After the completion of the exposure, the sheet of photosensitive glass 1 is heated to a high temperature of about 500° to 700° C. to crystallize the exposed portions 1c as shown in FIG. 3, thus carrying out a thermal development step.

Then, this sheet of photosensitive glass 1 is showered with an etchant consisting of 5 to 10% solution of hydrofluoric acid (HF). At this time, the time for which the photosensitive glass is bathed in the etchant is made different from location to location to vary the etched amount. In this way, as shown in FIG. 4, ink passages 1d having inclined portions are formed. In the present embodiment, both faces of the sheet of photo-sensitive glass are etched to form the ink passages 1d in the front and rear surfaces.

After a fluid passage substrate 1 consisting of the sheet of photosensitive glass has been fabricated in this manner, vibrating diaphragms 4 are stuck to the glass so as to clog up the ink passages 1d in both surfaces. Piezoelectric devices 5 are mounted on the diaphragms 4 to complete an ink jet printer head as shown in FIG. 5. The ink passages 1d in this head are supplied with ink from a supply means (not shown). When electric power is supplied to the piezoelectric devices 5, the vibrating diaphragms 4 deform inward to pressurize the ink inside the passages, thus ejecting the ink.

In the present invention, the sheet of photosensitive glass 1 is exposed with the laser beam as shown in FIG. 1. The spread of the light emitted from the laser can be reduced greatly. Hence, it substantially follows that the light propagates straight. Therefore, even if the sheet of photosensitive glass 1 is somewhat thick, both incident surface 1a and opposite surface 1b can be exposed accurately. In this way, where both faces are etched, fluid passages or the like having the same shape can be formed in both faces.

The spectral distribution of the light from the XeCl excimer laser used in the present embodiment is shown in FIG. 6. The oscillation wavelength of this XeCl excimer laser is 308 nm. The light intensity is almost 0 at other wavelengths. That is, there exist almost no wavelengths other than the wavelengths to which the photosensitive glass responds. Almost all the energy of the emitted radiation is used for the exposure of the photosensitive glass. For this reason, the efficiency of the exposure is high, and the operation time can be shortened. As described later, the intensity of laser radiation is stronger than that of light emitted from an ordinary ultraviolet lamp or the like and so the photosensitive glass responds to a wider range of wavelengths, about from 150 nm to 400 nm, emitted from the laser than the range of wavelengths emitted by an ultraviolet lamp.

In this embodiment, the laser beam having a quite small diameter is made to directly hit the sheet of photosensitive glass 1 to expose it. This is known as beam exposure. It is also possible to irradiate the photosensitive glass with a laser beam after masking the unexposed portions. For example, where an exposure pattern contains microscopic portions narrower than the diameter of the laser beam and an exposure operation is performed, one would consider to vary the focal point of the optics, using a lens, in order to focus the laser beam more sharply only for the above-described microscopic portions. However, this complicates the structure greatly. Accordingly, a patterning mask corresponding to the microscopic pattern is placed on the sheet of photosensitive glass. Under this condition, the glass is exposed by the laser beam. In this way, the glass can be exposed efficiently with a simple apparatus.

An example of such exposure step is shown in FIGS. 7 and 8. Specifically, a patterning mask 15 for exposure is placed on the sheet of photosensitive glass 1. The mask consists of light-transmitting portions 15a having the same shape as the ink passages 1d and light-blocking portions 15b having another shape. The laser beam is made to fall on the sheet of photosensitive glass 1 through this mask 15. As shown in FIG. 8, the light-transmitting portions 15a are totally scanned with the laser beam. Then, the thermal development step and the etching step illustrated in FIG. 3 are carried out, in the same way as in the above example, to form the ink passages 1d shown in FIG. 4. The vibrating diaphragms 4 and the piezoelectric devices 5 are mounted rigidly to complete the ink jet head shown in FIG. 5.

In this method, the light-blocking portions 15b do not transmit the laser light and, therefore, the photosensitive glass under these portions is not exposed. Consequently, microscopic processing can be performed. For example, grooves thinner than the diameter of the laser beam such as the nozzle of an ink jet head can be formed. Also, the processing accuracy can be enhanced by accurately forming the patterning mask 15.

In the above embodiment using the patterning mask for exposure, the laser beam is scanned to expose the glass in the case in which an area wider than the diameter of the laser beam is scanned. That is, an example of beam exposure was described. An example in which the diameter of the laser beam is increased to a value comparable to or above the size of the patterning mask for exposure to expose the whole area covered by the mask in one operation is described below in detail.

A conventional scheme of this exposure is first described by referring to FIG. 23. Light from a mercury lamp 16 is reflected by an elliptical concave mirror 17 and directed to a first mirror 18. The light reflected by the first mirror 18 is directed to a second mirror 20 via an integrator (fly's eye lens) 19. The light reflected by the second mirror is projected onto photosensitive glass 23 via a condenser lens 21 and a patterning mask 22 for exposure to expose the glass. In this conventional system, the first mirror 18 and the second mirror 20 are used to make the optics of the system small. The integrator 19 is employed to make the light intensity homogeneous. The condenser lens 21 is used to improve the rectilinearity of light. The mercury lamp 16 is also used in this conventional system. Therefore, the rectilinearity of light is not sufficient. Additionally, the exposure time is long, as mentioned above.

Individual steps of a novel method of processing photosensitive glass for etching microscopic grooves are described now one by one by referring to FIGS. 9–11.

As shown in FIG. 9, in the first step, the front surface 1a and the rear surface 1b of the sheet of photosensitive glass 1 having a thickness of 1 mm are both polished. An XeCl excimer laser 3 is located above the glass. The laser radiation illuminates the whole of the surface 1a of the photosensitive glass via a patterning mask 15 for exposure simultaneously. In this example, the laser 3 is shown to consist of only a laser. In practice, however, an optics similar to the optics of the conventional example shown in FIG. 23 is incorporated to extend the diameter of the thin laser beam approximately to the size of the photosensitive glass. The glass has the same composition as that of the glass used in the conventional example. The range of wavelengths of exposing light to which the photosensitive glass responds is between 240 nm and 360 nm, based on the spectral transmittance characteristics for an ordinary ultraviolet ray source. The range of wavelengths of exposing laser light to which the glass responds lies between 150 nm and 400 nm.

The specifications of the used XeCl excimer laser 3 were as follows: the oscillation wavelength was 308 nm; the energy per pulse was 80 mJ/cm$^2$; the pulse width was 20 nsec; and the repetition frequency was 200 Hz.

As shown in FIG. 10, in the second step, the exposed photosensitive glass 1 is heated to a high temperature of about 500° to 700° C. to crystallize the exposed portions 1c. That is, a thermal development step is carried out.

As shown in FIG. 11, in the next third step, this sheet of photosensitive glass 1 is showered with an etchant consisting of 5 to 10% solution of hydrofluoric acid to etch the glass. The crystallized exposed portions 1c are dissolved away to form grooves such as ink passages 1d.

The relation between the number of pulses from XeCl excimer laser beam, i.e., the total energy of exposing light, and the etch rate ratio is shown in FIG. 12.

The energy per pulse of the XeCl excimer laser beam was 80 mJ/cm$^2$. A quite high etch rate ratio of more than 10 was obtained. It can be seen that crystals which can be etched at a much higher rate than are the unexposed portions were formed.

Where photosensitive glass of the same composition was exposed with an extra-high pressure mercury lamp, an exposure time of about 30 minutes was needed to obtain an etch rate ratio almost equal to the above-described ratio. With the aforementioned XeCl excimer laser, one pulse is produced every 200 Hz. Therefore, the time is 0.005 second. It follows that the exposure time has been shortened by a factor of 360,000.

With respect to microscopic processing, in the case of the conventional extra-high pressure mercury lamp, about 6 μm has been the limit of microscopic processing. Where an exposure operation is performed with an XeCl excimer laser, if a depth of about 10 μm can be etched, even a pattern size of 2 μm is possible. This is effective for microscopic processing.

With respect to spread of light, it can be suppressed within about 0.23 degree. Where the photosensitive glass having a thickness of 1 mm is exposed and patterned into a width of 100 μm, the spread on either side is 4 μm. Therefore, the size of pattern on the rear side of the incident light is 108 μm. This means that the size has been reduced by a factor of 6 as compared with the size achieved with the conventional ultra-high pressure mercury lamp.

The patterning mask is not limited to a mask comprising a substrate 15 of quartz and light-blocking portions formed on the substrate as shown in FIG. 9. A mask comprising a light-blocking plate provided with holes formed in a desired pattern can also be employed.

A second embodiment of the present invention is next described. Referring to FIG. 13, a block of photosensitive glass 6 having a thickness of about 5 mm is irradiated with light from an XeCe laser to expose the glass, in the same way as in the first embodiment. After the exposure is completed, the block 6 is cut into small pieces 6a-6e along cutting lines 7 perpendicular to the exposure direction. For the cutting of the block 6, a slicing machine or dicing machine which is well known as a tool for cutting semiconductor wafers is exploited. After thermally developing the small pieces 6a-6e, they are arranged as shown in FIG. 14. One side of each small piece is covered with a protective member 8. Under this condition, an etchant (not shown) is poured onto them from above as viewed in the figure to etch them. After one side is etched in this way, the small pieces 6a-6e are reversed. Subsequently, the other side is similarly etched. In this way, the plural small pieces 6a-6e having their both sides processed similarly are obtained.

In this embodiment, the numerous plate members 6a-6e can be exposed simultaneously, so the operation efficiency is enhanced greatly. Also, a reduction in the operation time is possible. As shown in FIG. 14, the plural members are etched simultaneously. Consequently, the operation time can be shortened further. Especially, where numerous small pieces of the same shape are fabricated as in the present embodiment, the operation is quite efficient.

In order that the exposing light enter normally, the surface of the photosensitive glass is polished. Where a plurality of plate members are manufactured by the prior art techniques, the surfaces of the plate members would have been needed to be separately polished. In the present embodiment, it is only necessary to polish only the surface of the block 6. As such, the number of the polishing steps is reduced greatly. This improves the efficiency of the operation.

An example is illustrated in FIG. 15 in which an exposure operation is performed by this processing method, using a patterning mask for exposure. In particular, a patterning mask 15 consisting of light-transmitting portions 15a and light-blocking portions 15b is placed on the upper surface of a block of photosensitive glass 6. The block 6 is irradiated with laser radiation via this patterning mask 15. Subsequent thermal development step, etching step, and other steps are similar to those of the above-described example. In this way, microscopic and accurate processing can be performed by carrying out an exposure operation, using the patterning mask 15.

A third embodiment is described in FIG. 16, where a plurality of sheets of photosensitive glass 9a-9e are exposed concurrently while stacked on top of each other. Also in this method, the time of the exposure step can be shortened. In addition, the efficiency of the operation is improved. As shown in FIG. 17, accurate processing can be performed by carrying out an exposure operation, using a patterning mask 15 for exposure.

Since a laser beam goes quite straight, if the photosensitive glass is thick as in the second embodiment, or if plural sheets of photosensitive glass are stacked on top of each other as in the third embodiment, the beam hardly spreads in passing through the glass. This permits the glass to be exposed accurately throughout the glass from the upper surface to the lower surface. In consequence, the small pieces 6a-6e, 9a-9e fabricated according to the second and third embodiments can be etched with high dimensional accuracy.

In the first through third embodiments, the exposure operation is carried out while placing the photosensitive glass in the air. Where the exposure operation is effected in such a manner that the glass is immersed in a liquid having a refractive index approximating that of the glass, the operation is affected less by reflection and refraction of light at the surface of the glass and thus the glass can be exposed at higher accuracy. An example of this is shown in FIG. 18, where sheets of photosensitive glass 12a-12e are placed in a container 11 filled with a liquid 10 which has a refractive index approximating the refractive index (1.51117) of the photosensitive glass and which transmits light well. Benzene having a refractive index of 1.5012 is an example of this liquid. In the present embodiment, the sheets of glass 12a-12e are laminated via jigs (not shown) such that the sheets are spaced apart from each other vertically. The liquid 10 fills in the gaps between the sheets. The sheets of glass are exposed, using a laser beam, in the same manner as in the third embodiment. In this case, the operation is unaffected by reflection or refraction of light. Hence, the sheets of photosensitive glass 12a-12e are exposed accurately.

Any desired liquid can be used as the liquid 10 in which the sheets of photosensitive glass are immersed, as long as its refractive index is on the order of 1.5, i.e., approximates that of the photosensitive glass, and transmits light well. Examples of this liquid include carbon tetrachloride having a refractive index of 1.4607 and paraffin oil having a refractive index of 1.48. In this embodiment, the plural sheets of photosensitive glass are put in the liquid 10 while laminated in a spaced relation from each other. Where only one sheet member is exposed as in the first embodiment, or where a block is exposed as in the second embodiment, the accuracy can be enhanced by exposing the photosensitive glass within the liquid 10.

Of course, also in this case, finer processing can be performed by irradiating the sheets of photosensitive glass 12a–12e with a laser beam via a patterning mask 15 for exposure, as shown in FIG. 19.

Where photosensitive glass is exposed with a laser as in the above-described first through fourth embodiments, the spread of light is quite small, and the processing accuracy is improved. Especially, where a laser beam is caused to hit photosensitive glass via a patterning mask, finer processing is possible. Moreover, the efficiency is improved, since the energy of the irradiating laser radiation is not wasted.

Another embodiment in which photosensitive glass is exposed with other laser beam in the same way as in the first embodiment is described below.

Both faces of a substrate of photosensitive glass having a thickness of 1 mm are polished, in the same manner as in the embodiment illustrated in FIG. 9. An XeF excimer laser is located above the glass. The laser radiation is directed onto the surface of the photosensitive glass via a patterning mask for exposure.

The specifications of the used XeF excimer laser were as follows: the oscillation wavelength was 351 nm; the pulse width was 20 nsec; the energy per pulse was 60 mJ/cm$^2$; and the repetition frequency was 200 Hz.

Thereafter, a thermal processing step and an etching process were conducted, in the same way as in the above-described embodiments. We have found that the etch rate ratio was stable after 5 pulses were irradiated. The exposure was stable where the total energy exceeded 300 mJ/cm$^2$. Microscopic processability and rectilinearity were good in the same manner as in the case using the XeCl excimer laser.

The above-described wavelength of 351 nm is outside the range of wavelengths used for exposure when the relative exposure sensitivity (FIG. 22) of photosensitive glass measured, using an ordinary ultraviolet ray source, is taken into account. However, we have discovered that this wavelength can sufficiently practically expose photosensitive glass under normal conditions in which the laser radiation having an intense light energy is used.

Another example in which light from an ArF excimer laser is directed to photosensitive glass is described now. Both faces of a substrate of photosensitive glass having the same composition as that of the glass used in the above embodiments and having a thickness of 1 mm are polished. An ArF excimer laser is installed above the substrate. The laser radiation is projected onto the surface of the glass via a patterning mask for exposure. The specifications of the used ArF excimer laser were as follows: the oscillation wavelength was 193 nm; the pulse width was 20 nsec; the energy per pulse was 5 mJ/cm$^2$; and the pulse repetition frequency was 1 Hz. A thermal development step and an etching step were carried out. A stable etch rate ratio was obtained after 50 pulses were projected.

The aforementioned wavelength of 193 nm also lies outside the range of wavelengths used for exposure (see FIG. 22) measured, using an ordinary ultraviolet ray source described in Reference 1 and other references. However, it has been found that this wavelength can sufficiently practically expose photosensitive glass under normal conditions in which the laser radiation having an intense light energy is used. In this way, the range of wavelengths used for exposure in the above embodiments can be regarded as wider than the range of wavelengths used for exposure normally measured, using ultraviolet rays.

These results of experiments and the consideration of the above embodiments lead us to conclude that the range of wavelengths used for exposure of photosensitive glass is from 150 nm to 400 nm.

Accordingly, where an XeCl excimer laser is used, the optimum results arise. Other excimer lasers such as XeF, ArF, KrF, and F$_2$ excimer lasers can also be used. An N$_2$ laser can also be employed. Additionally, light sources in which the fundamental oscillation wavelength of an Nd$^-$: YAG laser, dye laser, Kr ion laser, Ar ion laser, or copper vapor laser is converted into a wavelength lying outside the ultraviolet range by a nonlinear optical device can also be used.

Another example in which an etching step is not effected after laser exposure will now be described.

Both faces of a substrate of photosensitive glass having the same composition as that of the glass used in the above embodiments and having a thickness of 1 mm are polished. An XeF excimer laser is located above the substrate. The laser radiation is projected onto the surface of the glass via a patterning mask for exposure.

The specifications of the used XeF excimer laser were as follows: the oscillation wavelength was 351 nm; the pulse width was 20 nsec; the energy per pulse was 8 mJ/cm$^2$; and the pulse repetition frequency was 200 Hz.

As described thus far, in accordance with the present invention, the spread of light is made quite small by exposing photosensitive glass to laser radiation. The processing accuracy is improved. Also, the efficiency is enhanced, because the irradiation energy is not wasted. In addition, thick photosensitive glass can be exposed accurately. Hence, a number of photosensitive glass members can be efficiently produced in a short time by dividing a block of photosensitive glass into plural parts after exposure or by exposing plural stacked sheets of photosensitive glass simultaneously.

Where an exposure step is carried out while immersing photosensitive glass in a liquid having a refractive index approximating that of the glass, the effects of reflection and refraction of light are small. Therefore, the exposure step can be effected with higher accuracy.

We claim:

1. A method of processing a photosensitive glass comprising the steps of:

providing a photosensitive glass which contains a photosensitive material and which is photochemically machinable;

exposing the photosensitive glass by irradiation of a laser whose oscillation wavelength lies in the range of from 150 to 400 nm;

thermally developing the glass to crystallize exposed portions of the glass; and etching the crystallized exposed portions.

2. A method of processing a photosensitive glass comprising the steps of exposing the photosensitive glass by irradiation of a laser whose oscillation wavelength lies in the range of from 150 to 400 nm; said step of exposing the photosensitive glass by irradiation of a laser being carried out while immersing the photosensitive glass in a liquid having a refractive index approximating that of the glass, thermally developing the glass to crystallize exposed portions of the glass; and etching the crystallized exposed portions.

3. A method of processing a photosensitive glass as set forth in claim 1, wherein said step of exposing the photosensitive glass by irradiation of a laser comprises moving the laser radiation relative to the photosensitive glass to form an exposure pattern.

4. A method of processing a photosensitive glass as set forth in claim 1, wherein said step of exposing the photosensitive glass by irradiation of a laser comprises exposing the photosensitive glass to the laser radiation via an exposure patterning mask placed on the glass.

5. A method of processing a photosensitive glass as set forth in claim 1, wherein said laser is an excimer laser.

6. A method of processing photosensitive glass as set forth in claim 1 further comprising providing at least one of gold, silver and copper as the photosensitive material for the photosensitive glass.

7. A method of processing a photosensitive glass as set forth in claim 1, further comprising the step of cutting the photosensitive glass into plural parts in a direction not parallel to the direction of exposure.

8. A method of processing a photosensitive glass as set forth in claim 1, wherein said step of exposing the photosensitive glass by irradiation of a laser comprises exposing plural stacked sheets of the photosensitive glass to the radiation from the laser simultaneously.

9. A method of processing a photosensitive glass as set forth in claim 1, wherein said step of exposing the photosensitive glass by irradiation of a laser is carried out while immersing the photosensitive glass in a liquid having a refractive index approximating that of the glass.

10. A method of processing photosensitive glass comprising the steps of:
disposing a plurality of layers of photosensitive glass in superimposed array;
immersing said superimposed array of layers in a liquid;
exposing said superimposed array of layers with a laser in an exposing direction such that all of said layers in said superimposed array are concurrently and simultaneously exposed while immersed in said liquid;
thermally developing each of said exposed layers; and
etching the crystallized portions of each of said thermally developed articles;
whereby a plurality of layers are produced utilizing concurrent and simultaneous exposure by said laser of said plurality layers in said stack prior to said thermal developing steps to thereby enhance production of said etched articles.

11. A method of processing a photosensitive glass comprising the steps of:
providing a block of photosensitive glass;
exposing said block with a laser in an exposing direction;
cutting said block in a direction not parallel to said exposure direction to form a plurality of separate articles;
thermally developing each of said articles; and
etching the crystallized portion of each of said thermally developed articles;
whereby said plurality of articles are simultaneously exposed by said laser while said articles are still uncut and part of said block to thereby enhance production of said etched articles.

12. A method according to claim 11 wherein said block has two generally parallel surfaces extending non parallel to said exposure direction, further comprising the step of:
polishing said two surfaces before said exposure step to facilitate said exposure step by said laser; and
proceeding with the remainder of the steps of the process without polishing the articles at the cut surfaces of each article.

13. A method according to claim 11 wherein said step of exposing comprises utilizing a patterning mask while exposing said block with said laser.

14. A method according to claim 11 further comprising the step of effecting relative movement between said laser and said block during the exposure step to thereby provide an exposure pattern on said block.

15. A method according to claim 11 wherein said exposing step comprises immersing said block in a liquid and effecting said exposing step while said block is immersed in said liquid.

16. A method of processing photosensitive glass comprising the steps of:
disposing a plurality of layers of photosensitive glass one on top of another in superimposed relationship to form a layered stack;
exposing said layered stack with a laser in an exposing direction such that all of said plurality of layers are concurrently and simultaneously exposed;
thermally developing each of said exposed layers; and
etching the crystallized portions of each of said thermally developed articles;
whereby a plurality of layers are produced utilizing concurrent and simultaneous exposure by said laser of said plurality of layers in said stack prior to said thermal developing steps to thereby enhance production of said etched articles.

17. A method according to claim 16 wherein adjacent layers of said stack are in contact with one another.

18. A method according to claim 16 wherein adjacent layers of said stack are spaced from one another.

19. A method according to claim 18 further comprising immersing said layered stack in a liquid during said exposing step.

20. A method according to claim 10 further comprising the steps of:
disposing said plurality of superimposed layers in spaced relationship such that each layer is spaced from the next adjacent layer;
said immersing step comprising immersing said spaces with said liquid.

21. A method according to claim 10 wherein said liquid has a refractive index approximating that of the photosensitive glass.

22. A method according to claim 10 wherein said liquid is selected from the group consisting of benzene, carbon tetrachloride and parafin oil.

* * * * *